(No Model.) 3 Sheets—Sheet 3.
P. J. McNAMARA & J. L. ANDREWS.
HAY STACKER.
No. 495,171. Patented Apr. 11, 1893.
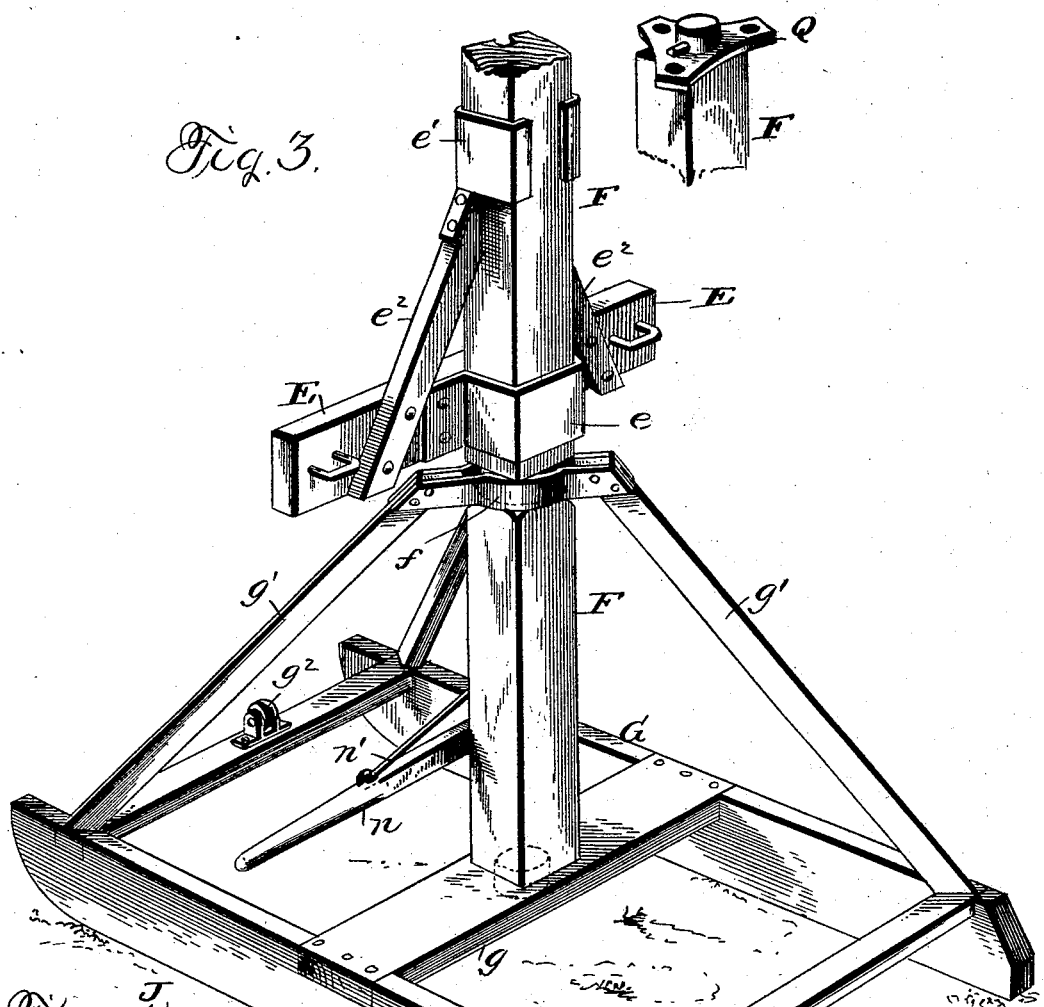
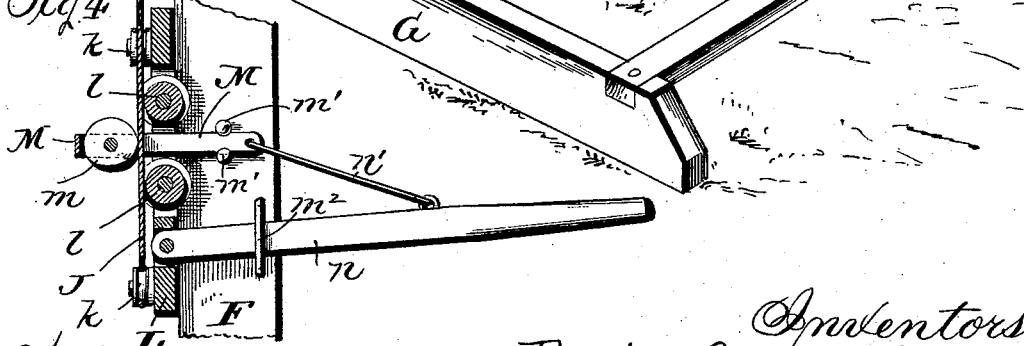
Witnesses
C. J. Williamson
G. J. Rogers
Inventors
Patrick J. McNamara
James L. Andrews
by Franklin H. Hough
Atty.

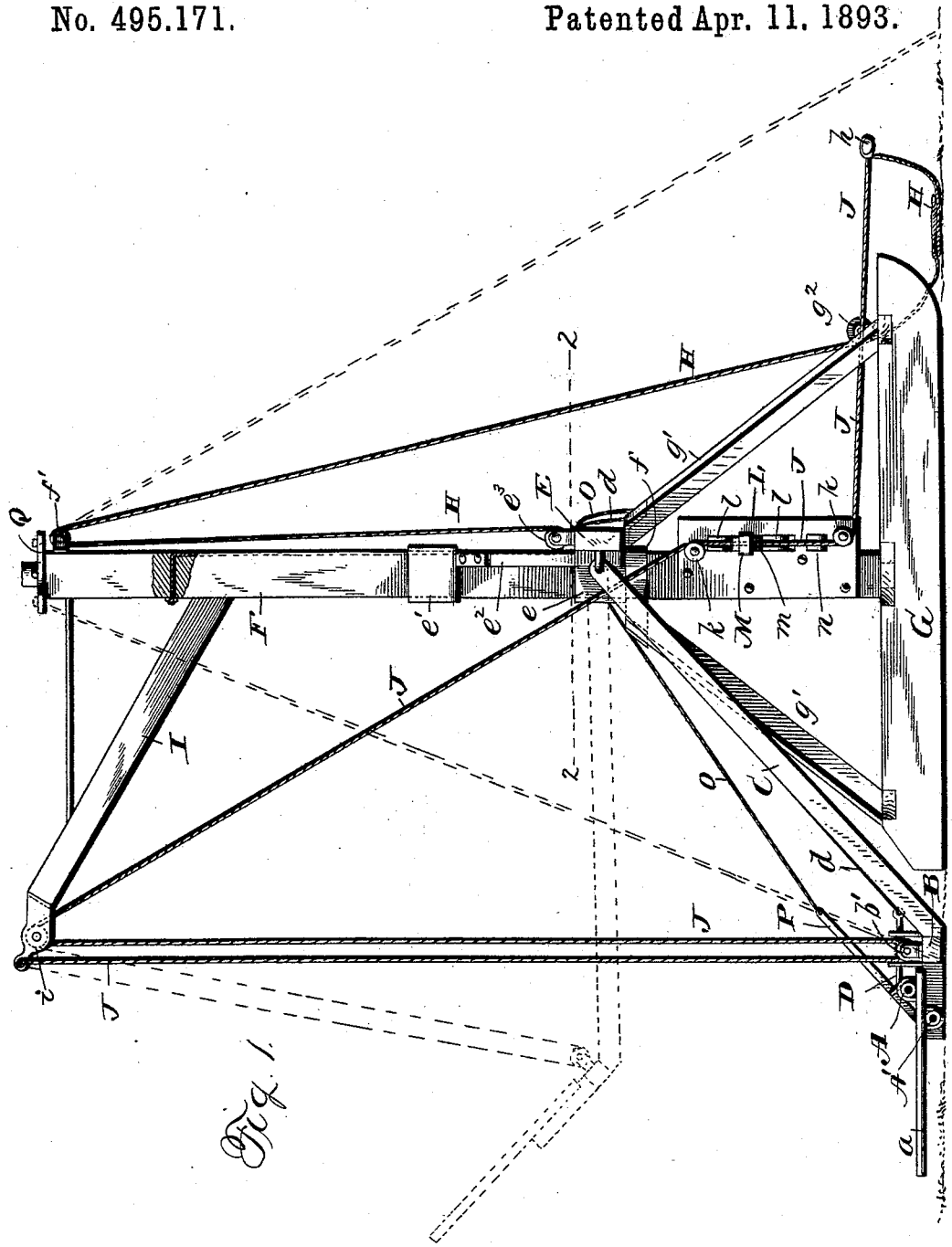

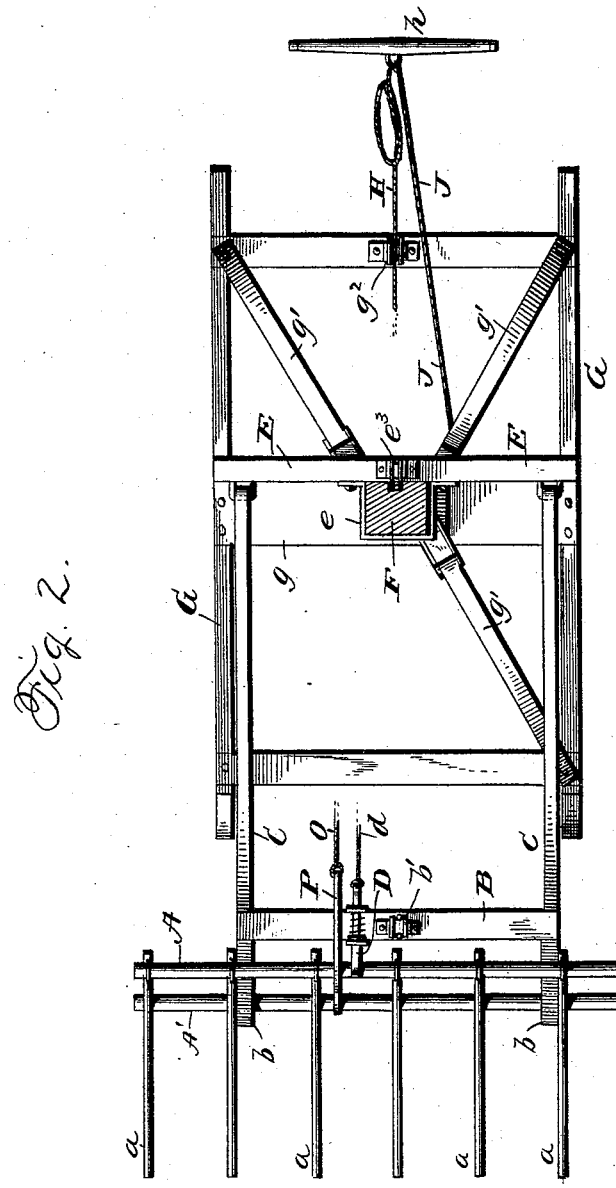

UNITED STATES PATENT OFFICE.

PATRICK J. McNAMARA AND JAMES L. ANDREWS, OF SUMNER, MISSOURI.

HAY-STACKER.

SPECIFICATION forming part of Letters Patent No. 495,171, dated April 11, 1893.

Application filed November 30, 1892. Serial No. 453,577. (No model.)

*To all whom it may concern:*

Be it known that we, PATRICK J. MCNAMARA and JAMES L. ANDREWS, citizens of the United States, residing at Sumner, in the county of Chariton and State of Missouri, have invented certain new and useful Improvements in Hay-Stackers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to hay-stackers, and our object is the provision of a simple and strongly constructed machine of increased efficiency by reason of its parts being arranged so as to admit of easy and convenient manipulation, and because of its adaptability to dumping the load of hay at any desired altitude within the range of movement of the fork or carrier.

To the ends indicated, the invention consists in the hay stacker having the construction and arrangement of parts hereinafter specified, and illustrated in the accompanying drawings, in which—

Figure 1 is a side elevation of our improved stacker. Fig. 2, is a horizontal section upon the line 2, 2 of Fig. 1. Fig. 3, is a detail perspective view of the derrick portion and its supporting frame, the forks being removed, and, Fig. 4, is a detail view in section of the brake or stop mechanism.

The fork or carrier of our stacker comprises, as is usual, a number of parallel tines or bars $a, a$, that are united at their extreme rear ends to a transverse bar A, and in advance of the latter, to a second transverse bar A′, which is secured to them on their under sides. Preferably, we employ sections of gas pipe for both the tines and the transverse bars. The under bar A′ is pivotally attached to the two arms $b, b$, that project horizontally forward from a transverse bar B, that with two upwardly and rearwardly inclined bars C, C, form a frame to support the fork as it is hoisted and lowered. The fork is locked from tilting downward at its front end, by a spring actuated sliding latch D that is mounted on the bar B and whose front end engages the bar A on its upper side. The rear ends of the bars C are pivotally connected to the front side of a vertically movable transverse bar E that, at its longitudinal center is attached by a strap $e$ to a vertical post F that is rectangular in cross-section, which it is adapted to move. For steadying it in its movements, a second strap or collar $e'$ conforming to the shape of the post, is placed around it a short distance above the first that is connected by arms or bars $e^2$ with said bar E. The post F is mounted on the central cross-bar $g$, of the sled G, and has a pintle or stud at its lower end journaled in said bar, which enables the post and the parts carried thereby, including the fork, to be swung around in a horizontal direction. The post F is braced by inclined bars $g'$, that rise from the sled and are secured to a collar $f$ that encircles a rounded portion thereon, so as not to impede its rotation.

The hoisting of the bar E is effected through a rope H, that, after passing around a pulley $e^3$ at its transverse center, has one end attached to the post F near its upper end and its other end after passing to and around a pulley $f'$ upon the upper end of said post F and down to and around a pulley $g^2$ on the sled G, attached to a whiffletree $h$ to which a horse may be attached. The face of the post F is grooved to receive the rope H, so that said rope will not be in the way of the strap $e'$. Near its upper end on its front side the post F has fixed a forwardly and upwardly inclined beam I to whose outer end is attached a rope J that descends to and passes around a pulley $b'$ mounted on the bar B of the fork carrying frame. From said pulley the rope passes upwardly to a pulley $i$ secured to the beam I near its outer end and from the pulley $i$ downward to two guide pulleys $k, k$ at the base of the post F. Said rope then passes to and is attached to the whiffletree $h$. The guide pulleys $k, k$, are placed vertically in line with each other, and midway between them we provide a brake or stop device to act on the rope. Said device comprises two fixed pulleys $l, l$, journaled one above the other and in a slot in a frame L, and a pulley $m$ journaled at the end of the sliding bar M. The rope J passes between said fixed pulleys and the movable one, and the latter is of such diameter that it can be moved to clamp the rope against the former, with a degree of pressure to entirely stop the movement of the rope. The moving of the pulley *m* is effected by a hand lever N, that is pivoted to the frame L and is connected by a link *n* with the bar M. The latter is suitably guided by pins *m'* on the post, and the lever N is held to the post by a loop or link *n'*. The lever N is extended out to the side of the sled and besides the office just described, is employed to rotate the post F.

The operation is as follows. With the parts in the position shown in Fig. 1, the horse hitched to the whiffletree *h* pulls thereon. As the rope J is made shorter than the rope H, the first effect will be to lift the fork, and such lifting will continue until the side bars C, C of the fork carrying frame (which it will be remembered are pivoted to the bar E), reach substantially a horizontal position, while the fork will incline upward and forward. This position of the fork will secure the retention of the hay against removal by the wind. By the time the parts reach this position, the excess of rope H is drawn out, and said rope begins to draw on the cross-bar B, which will then move upward simultaneously with the fork. When the desired height is reached, the operator, by using the hand lever N grips the rope J and thus stops the hoisting, and then by means of said lever N swings the fork with its load around to the desired point for dumping. The dumping is effected by releasing the latch D by pulling on a cord *d* attached to the same and carried to a point within reach of the operator. A second cord O also within convenient reach, and attached to the arm P on the fork, serves to restore the fork to the position for another load, after having been tilted to dump. It will of course be understood that the dumping is done by the tilting of the fork by gravity.

In order to add to the stability of the machine, a plate Q is swiveled on the upper end of the post F, to which suitable guy ropes are attached. The guide strap *e'* is slotted as shown, to enable it to pass the beam I.

What we claim as new, and desire to secure by Letters Patent, is—

1. In combination with a vertical post, a bar movable up and down thereon, the fork carrying frame pivoted to said bar, and the means for first swinging said frame upward to a horizontal position and tilting the fork and then by a continuous movement carrying it and the bar bodily upward, substantially as and for the purpose described.

2. In combination with a vertical swiveled post, a bar movable up and down thereon, the fork-carrying frame pivoted to said bar, and the two ropes of unequal length connected to the same drawing part, one to said bar and the other to said frame, substantially as described.

3. In combination with a vertical swiveled post F, a bar movable up and down thereon, the fork carrying frame pivoted to said bar, the rope H passed around a pulley on said bar and attached at one end to the upper end of said post and at its other end attached to the whiffletree after passing around a pulley at the upper end of said post, the rope J connected with said frame, that passes over a pulley on the beam projecting from said post F and is connected also with said whiffletree, substantially as described.

4. In combination with the fork lifting rope of a hay-stacker the guide pulleys in the same vertical line, the two fixed pulleys between the guide pulleys, the movable pulley between them, the reciprocable bar carrying the latter, and the pivoted hand lever connected to said bar.

5. In combination with the pivoted vertical post of a hay stacker, a lever pivoted to said post and adapted to actuate a brake and to serve as a handle to revolve said post, substantially as described.

6. In combination with the pivoted vertical post of a hay-stacker, and the fork lifting rope, the brake comprising fixed and movable parts between which said rope passes, carried by said post, and the lever pivoted to said post and connected with the movable part, substantially as described.

7. In a hay-stacker, in combination with the pivoted vertical swiveled post, the bar E movable up and down the same, having straps attaching it thereto, the frame pivoted to said bar, the tilting fork pivoted to said frame, the latch on the frame to engage the fork, the rope to release the latch, the arm P on the fork, and its rope to restore the fork to a load carrying position, the lifting rope H attached to the bar E and to a whiffletree, the lifting rope J attached to the fork carrying frame and to said whiffletree, and the brake to operate on the rope J.

8. In a hay-stacker, in combination a vertical post angular in cross-section, a fork lifting bar movable up and down said post, and the strap attached to said bar and conforming to the shape of the post, substantially as described.

In testimony whereof we affix our signatures in presence of two witnesses.

PATRICK J. McNAMARA.
JAMES L. ANDREWS.

Witnesses:
K. H. LEWIS,
A. L. LEWIS.